United States Patent [19]

Stover

[11] 4,024,496

[45] May 17, 1977

[54] VEHICLE WARNING ASSEMBLY

[76] Inventor: Ernest L. Stover, 1030 North St., Lockport, Ill. 60441

[22] Filed: Apr. 27, 1976

[21] Appl. No.: 680,688

[52] U.S. Cl. .............................. 340/63; 307/10 AT; 180/114

[51] Int. Cl.² ........................................ B60R 25/10

[58] Field of Search ........................ 340/63, 64, 65; 307/10 AT, 10 BP, 10 LS; 180/114

[56] References Cited

UNITED STATES PATENTS

| 2,594,196 | 4/1952 | Moledzky | 340/63 |
| 3,891,967 | 6/1975 | Betts | 340/63 |

*Primary Examiner*—Alvin H. Waring
*Attorney, Agent, or Firm*—Ernest Kettelson

[57] ABSTRACT

A vehicle warning assembly connected to the electrical system of a vehicle, to warn of unauthorized entry into the vehicle, wherein a switch is mounted on the exterior and is operable only from outside of the vehicle. The switch has three positions, one to set or energize a flasher circuit to make the interior courtesy or dome lights flash on and off in the event someone makes an unauthorized entry into the vehicle. The headlights and tail lights may also be connected in the flasher circuit, which includes means to flash certain lights on and off in alternating sequence, such as those on one side of the vehicle flashing on while those on the other side are momentarily off, then those on the first side flashing off momentarily while those on the other side flash on, and so on in such alternating sequence. A second position is to turn on the interior courtesy or dome lights, which both tests the system to see whether it is still working, and if working, it lights up the interior of the vehicle to reveal whether anyone may be hiding therein. If the interior lights do not go on when the switch is in the second position, it is an indication that someone may have tampered with the system, may have gained entry, and may be hiding inside. The third position turns the system off and opens the warning circuit until it is desired to use again.

12 Claims, 4 Drawing Figures

VEHICLE WARNING ASSEMBLY

BACKGROUND OF THE INVENTION

This invention relates to the field of safety lights and switching devices for vehicles such as autos, trucks, boats, motor homes, house trailers and the like, to warn of unauthorized entry therein.

Flasher circuits which become operable when someone enters an automobile without deactivating the flasher circuit are known. However, such systems are typically connected to the vehicle electrical system on the inside, and can be deactivated by pulling electrical wires away from their terminals or causing them to break. Furthermore, they do not include means to test the system from the outside to determine if it is in proper working order before the persons authorized to do so enter the vehicle.

SUMMARY OF THE INVENTION

It is an object of the invention to provide a safety light and switch warning assembly for vehicles to warn of unauthorized entry and to test such assembly before entering to determine whether it is still operable or has been tampered with or disable.

It is an object of the invention to provide a safety light and switch warning assembly for vehicles having a set or armed position to cause lights to flash on and off if entered thereafter without disarming the flasher circuit and to test such flasher circuit by authorized personnel before they enter.

It is an object of the invention to provide a safety light and switch assembly for vehicles having a flasher circuit to warn of unauthorized entry, in which said circuit is connected entirely outside of the passenger compartment and cannot be deactivated, de-energized or opened from inside the passenger compartment.

It is an object of the invention to provide a safety light and switch warning assembly for vehicles having a test circuit to test a warning circuit and to turn on interior lights for visual inspection of the interior, such test circuit being connected entirely outside of the passenger compartment for access by authorized personnel before entering and to prevent an intruder from damaging or disabling the circuit.

It is an object of the invention to provide a safety light and switch warning assembly for vehicles which includes a flasher circuit, said flasher circuit being optionally able to flash selected lights in alternating sequence, such as those on one side of the vehicle flashing on while those on the other side are flashing off, or the headlights flashing on while the taillights are flashing off, and vice versa, to distinguish from standard emergency flashing lights which may be set by the operator and thus attract the attention of passersby and indicate to them a difference between ordinary emergencies of the road and an unauthorized entry or attempt.

DESCRIPTION OF PREFERRED EMBODIMENT

A safety light and warning system for vehicles in accordance with this invention includes a switch 1 mounted for access outside of the vehicle 2, near the door 3 on the driver's side.

Figure 3:
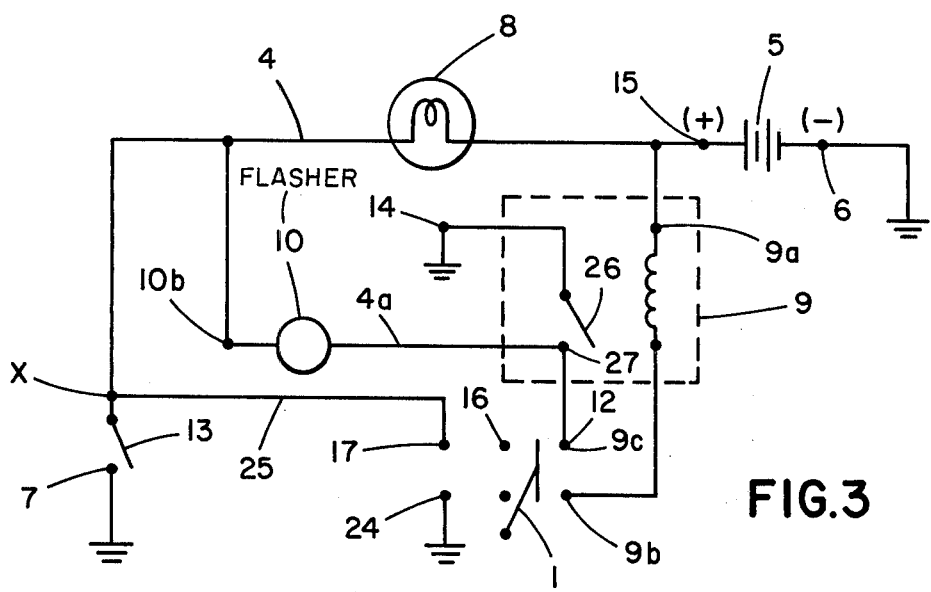
FIG. 3 is a schematic illustrating the warning and testing circuits in accordance with this invention.

The switch 1 is connected in a warning and testing circuit 4 as illustrated schematically in FIG. 3.

A battery 5 provides a D.C. power source for circuit 4, the battery being grounded on the negative side 6 and circuit 4 being connected to ground at terminal 7 which is connected to the vehicle body, to complete the circuit 4. An interior lamp 8 is series connected in circuit 4.

A relay 9 and a flasher component 10 are connected to circuit 4 at relay terminal 9a and in series with switch 1 at terminals 9b and 9c. The relay 9 and flasher 10 are series connected on printed circuit board 11, which is then connected to circuit 4 at terminal 10b, thus connecting the relay 9 and flasher 10 in a parallel circuit 4a with interior lamp 8.

Figure 2:
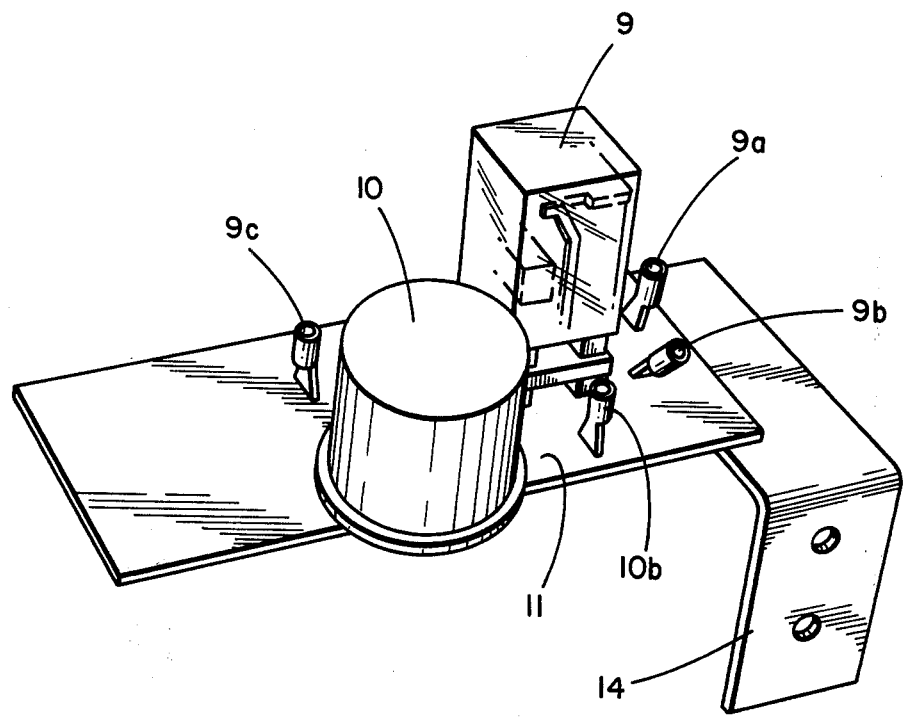
FIG. 2 is a perspective view of a switching relay and flasher assembly in accordance with this invention, mounted on a printed circuit board.

When switch 1 is moved to "set" position 12, the parallel relay and flasher circuit 4a is completed or closed and ready to respond upon opening door 3. When vehicle door 3 is opened, the push-button door jamb switch 13 is released to close the negative ground battery powered circuit 4 thus energizing interior lamp 8 as well as relay 9 and flasher 10 in parallel therewith. Relay 9 is connected to ground terminal 14, comprising the L-shaped mounting bracket shown in FIG. 2, to complete a ground path circuit to grounded negative terminal 6 of battery 5 after the vehicle door 3 is closed depressing door jamb switch 13 thus interrupting the ground path circuit between ground terminal 7 and negative battery terminal 6. The ground path circuit between grounded relay terminal 14 and negative battery terminal 6 thus completes a circuit from positive battery terminal 15 through interior lamp 8, flasher component 10, relay 9 and negative battery terminal 6. The interior lamp 8 thus continues to flash off and on even after the vehicle door has been closed. It will continue to flash on and off until the circuit is interrupted by moving switch 1 from the "set" position 12, either to the "off" position 16 or the "test" position 17.

Figure 4:
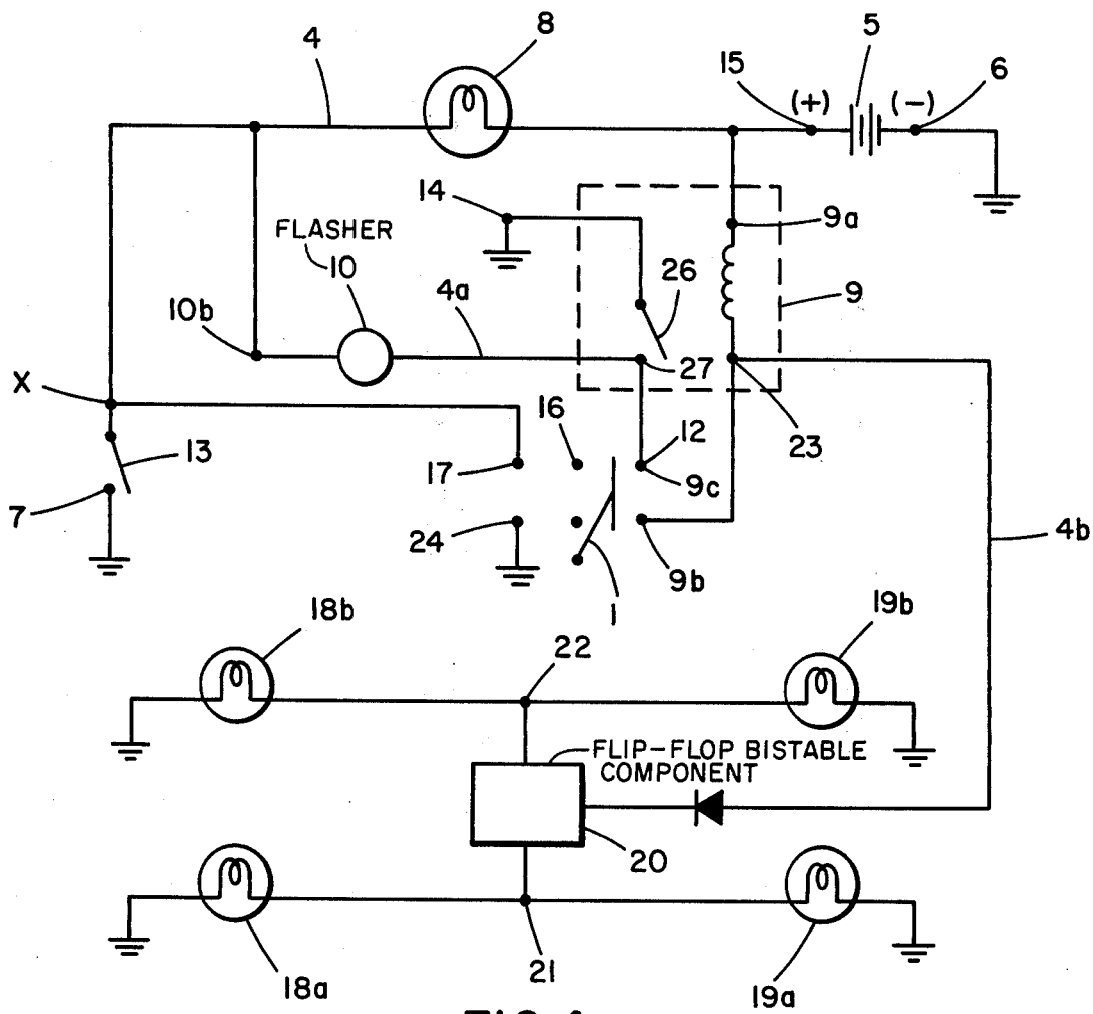
FIG. 4 is a schematic illustrating modified warning and testing circuits in accordance with this invention.

A modification is illustrated in FIG. 4, in which the headlights 18a and 18b and taillights 19a and 19b of the vehicle are also connected in a series circuit with relay 9 which includes a bistable component 20 having a flip-flop circuit. Thus, when the relay circuit 4a becomes energized upon opening the vehicle door 3, the headlights and taillights also flash off and on as a warning signal. The flip-flop bistable component 20, which may comprise a pair of transistors cross-coupled collector to base in known manner to provide a flip-flop circuit having opposite terminals 21 and 22, is connected between the combination of headlight 18a-taillight 19a on one side of the vehicle and headlight 18b-taillight 19b on the other side. Bistable component 20 is connected in series with relay 9 at terminal 23. Thus when relay circuit 4a is completed by closing of the relay contacts 26 and 27, the flip-flop circuit of bistable component 20 becomes energized and directs current alternatetly to terminals 21 and 22. The headlight 18a-taillight 19a combination on one side of the vehicle is connected to terminal 21 and flashes on when current is directed through that terminal; off when current is directed through terminal 22. The headlight 18b-taillight 19b combination on the other side of the vehicle is connected to terminal 22 and flashes on when current is directed through that terminal; off when current is directed through the other terminal 21.

The test position 17 of the switch 1 is connected to ground terminal 24 and conductor 25 leading to junction X with circuit 4 in which interior lamp 8 is connected in series. Thus when switch 1 is moved to test position 17, a ground path circuit is completed between ground terminal 24 and grounded negative terminal 6 of the battery 5, thereby completing the series circuit from positive terminal 15, through interior lamp 8, junction X and switch 1, to cause lamp 8 to light.

The invention described above is used as follows. When the vehicle is to be left unoccupied, switch 1 is moved to the "set" position 12 to set the relay flasher circuit so it may respond when the relay 9 becomes energized to close the relay contacts 26 and 27.

If the vehicle door 3 is opened while switch 1 is in the "set" position 12, door jamb switch 13 closes thus completing circuit 4 through interior lamp 8 causing it to turn on. Since relay 9 is connected in parallel with the interior lamp 8, the relay 9 is also energized at such time causing its coil to move its armature thus closing relay contacts 26 and 27 and completing the flasher relay circuit causing interior lamp 8 in parallel therewith to flash off and on. Since relay 9 is connected directly to battery 5 through the ground path circuit between terminal 14 of the relay 9 and negative terminal 6 of battery 5, once the relay contacts 26 and 27 are in contact closed position the flasher and interior lamp circuit will remain completed and energized even after vehicle door 3 is closed and door jamb switch 13 opens the circuit at that point. The only way the interior lamp and flasher circuit can be interrupted once the relay circuit becomes energized is to move switch 1 away from the "set" position 12. Since switch 1 is located for access only on the exterior of the vehicle, the circuit cannot be interrupted from the interior of the vehicle. The circuit board 11 with flasher 10 and relay 9 mounted thereon is mounted on the vehicle frame or body outside of the passenger compartment.

It may be possible to break the interior lamp 8, so the flashing warning signal will not be present to signal a warning that an intruder is inside when an authorized person returns to enter the vehicle. It is for this reason that "test" position 17 is provided on exterior switch 1. Before entering the vehicle, the switch 1 may be moved from the "set" position 12 to the "test" position 17 whereupon interior lamp 8 should light. If it has been broken so it does not light, this is a warning signal that something is wrong enabling the person desiring to enter the vehicle to investigate carefully before entering or to seek assistance without attempting to enter.

With modification described above which connects the headlights and taillights to relay 9, they will begin to alternate off and on from one side to the other when vehicle door 3 is opened causing relay circuit 4b to be completed thus energizing the flip-flop circuit of bistable component 20. The circuit 4b will likewise remain completed after vehicle door 3 is closed which causes door jamb switch 13 to open. The circuit 4b will remain completed causing the headlight-taillight combinations on each side of the vehicle to continue flashing on and off in alternating cycles as long as the contacts 26 and 27 of relay 9 remain closed. An intruder inside of the vehicle cannot damage, or disable or disconnect the flashing exterior headlights and taillights, at least not without leaving the vehicle and attempting to break or disconnect them from outside which would attract attention.

By causing the headlights and taillights to alternate off on one side while those on the other side alternate on, a conspicuous and unique signal is provided to indicate the presence of an intruder as distinguished from some other type of vehicle emergency in which the operator of a vehicle may himself turn on the vehicle's emergency flashers, which flash all headlights and taillights off and on in unison.

An alternate use of the system may in some cases dispense with arming or setting the relay circuit. In such cases, the switch 1 is not moved to "set" position 12 when leaving the vehicle unattended. Thus, an intruder may enter the vehicle without setting off the warning signals of flashing interior and exterior lights. When the operator of the vehicle returns, he will move the exterior switch 1 to the "test" position 17 causing interior lamp 8 to light thus enabling one to look inside the vehicle and see whether someone is lurking therein or not before attempting to enter the vehicle.

In describing this invention, only one vehicle door 3 has been mentioned, but it is obvious that any and/or all vehicle doors can include a door jamb switch to complete the interior light circuit, which can also energize the relay circuit in the same manner as described above.

Figure 1:
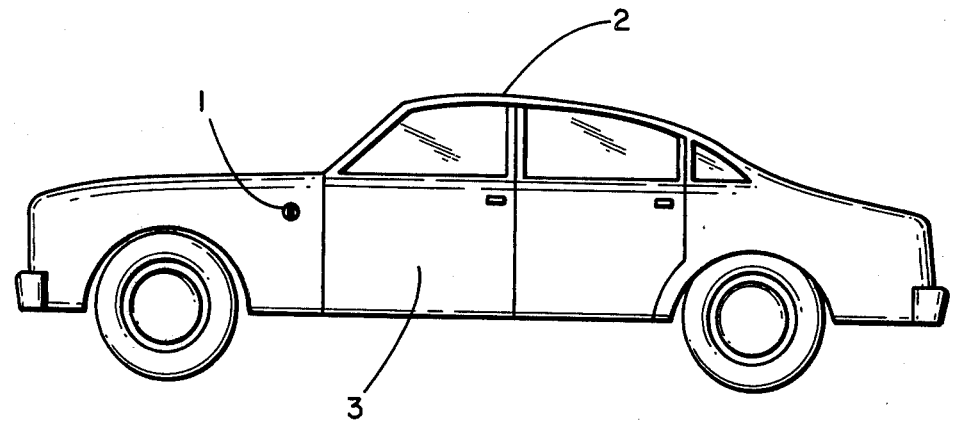
FIG. 1 is a perspective view of an automobile illustrating a switch mounted on the exterior of the vehicle in accordance with this invention.

The exterior switch 1 includes a lock mechanism of any known type such as a key lock switch. The lock and switch mechanism may in addition be concealed, such as behind a panel of the vehicle body which may be hinged to open and close. The switch 1 is preferably located in close proximity to the door adjacent the vehicle operator's seat, and along that part of the vehicle body exterior which is adjacent the hinged side of the door 3. By positioning the switch at such location as shown in FIG. 1, the door will serve as a protective barrier if swung open by an intruder lurking inside when the interior light flashes on as a result of the operator turning switch 1 to the "test" position 17 before attempting to enter. The operator will thus be on one side of the door and the intruding attacker on the other. In parking lots of shopping centers and the like, where automobiles are parked parallel and relatively close to each other, the opened door will extend to, or nearly to, the adjacent auto thereby providing a complete block. Even if only a momentary barrier is provided, it can enable an intended victim to escape or run into a relatively populated or open lighted area to attract attention.

I claim:

1. A vehicle warning assembly connected to the electrical system and power source of said vehicle, including a first circuit, first switch means connected in said first circuit and being movable between a circuit-armed position and a circuit-disarmed position, said first circuit being connected to said power source, signal means connected in series in said first circuit, second switch means actuated by movement at entrance means to said vehicle to close said first circuit and energize said signal means, a second circuit in parallel with said signal means, third switch means connected between said second circuit and said power source, said third switch means including normally open contacts closeable on energizing said signal means and said second circuit in parallel therewith when said first switch means is in said circuit-armed position, said normally open contacts remaining closed to complete a connection between said power source and said second circuit after said second switch means has been opened and until said first switch means is moved to a circuit-disarmed position, fourth switch means connected in said first circuit in series with said signal means and being movable between a circuit-open and a circuit-closed position, an exterior switch operator mountable on said vehicle for access from outside of said vehicle, said switch operator connected to operate said fourth switch means, said signal means in said first circuit being energized when said fourth switch means in series therewith is moved to a circuit-closed position by said exterior switch operator.

2. A vehicle warning assembly as set forth in claim 1, wherein said signal means is a first lamp mounted on the interior of said vehicle, and wherein said exterior switch operator includes first and second switching positions, said fourth switch means being moved to its said circuit-closed position when said exterior switch operator is in said first position, said exterior switch operator being also connected to operate said first switch means, said first switch means being moved to its circuit-armed position when said switch operator is in said second position.

3. A vehicle warning assembly as set forth in claim 1, including second lamp means mounted on the exterior of said vehicle, said second lamp means being energized when said third switch means is closed, and wherein said third switch means includes a single relay having a pair of normally open contacts, a coil connected in said second circuit operatively associated with said normally open contacts to close said contacts when said second circuit and coil connected therein are energized.

4. A vehicle warning assembly as set forth in claim 3, wherein said second lamp means includes a third lamp mounted on one side of the exterior of said vehicle and a fourth lamp mounted on the opposite side of said vehicle.

5. A vehicle warning assembly as set forth in claim 4, including flip-flop circuit means having a first and second terminals, said flip-flot circuit means being connected between said third switch means and said exterior second lamp means, said exterior third lamp being connected to said first terminal of said flip-flop circuit means, said exterior fourth lamp being connected to said second terminal of said flip-flop circuit means, said flip-flop circuit means being energized upon closing of said contacts of said third switch means, said third lamp connected to said first terminal being energized when said fourth lamp connected to said second terminal is de-energized, said third lamp and first terminal being de-energized when said fourth lamp and second terminal are energized.

6. A vehicle warning assembly as set forth in claim 1, including a vehicle, wherein said first switch means is mounted on said vehicle for access outside thereof.

7. A vehicle warning assembly as set forth in claim 6, wherein said vehicle includes a passenger compartment, said third switch means being mounted on said vehicle outside of said passenger compartment.

8. A vehicle warning assembly as set forth in claim 2, wherein said power source includes a battery having one terminal connected to ground on said vehicle, and wherein said third switch means includes a relay having said normally open contacts which are closeable on energizing said second circuit, said relay including a ground terminal, said relay completing a ground path to said battery terminal connected to ground when said normally open contacts of said relay are moved to a contact closed position.

9. A vehicle warning system as set forth in claim 8, wherein said relay includes second terminal means, said second terminal means being connected to said second circuit, said second terminal means completing a circuit through said ground terminal of said relay and said grounded terminal of said battery when said normally open contacts of said relays are moved to a contact closed position to energize said second circuit having said signal means connected therewith, said second circuit thereby being connected in circuit with said battery to continue to energize said signal means after said second switch means has been opened.

10. A vehicle warning system as set forth in claim 9, including a vehicle having a passenger compartment, a door opening to said passenger compartment, wherein said second switch means includes a push-button operator to move the contacts of said second switch means between contact open and closed positions, said push-button operator being normally biased in the contact closed position, said push-button operator being mounted for engagement with said door to move said push-button operator to a contact open position when said door is closed.

11. A vehicle warning system as set forth in claim 10, wherein said vehicle door is hinged along a first edge thereof and said exterior switch operator connected to operate said first switch means is mounted on said vehicle for access outside thereof at a location thereon adjacent said hinged first edge of said door, said door providing barrier means when opened between the entrance to said vehicle and said exterior switch operator.

12. A vehicle warning assembly as set forth in claim 2, wherein said exterior switch operator includes a third switching position, said first switch means being moved to its circuit-disarmed position and said fourth switch means being moved to its circuit-open position when said exterior switch operator is in said third switching position.

* * * * *